United States Patent
Kim et al.

(10) Patent No.: US 11,038,247 B2
(45) Date of Patent: Jun. 15, 2021

(54) BATTERY CELL AND METHOD OF MANUFACTURING ELECTRODE LEAD

(71) Applicant: LG Chem, Ltd., Seoul (KR)

(72) Inventors: Na Yoon Kim, Daejeon (KR); Yong Su Choi, Daejeon (KR); Sanghun Kim, Daejeon (KR); Hyungkyun Yu, Daejeon (KR); Sooji Hwang, Daejeon (KR); Minhyeong Kang, Daejeon (KR); Yong Kim, Daejeon (KR)

(73) Assignee: LG Chem, Ltd.

( * ) Notice: Subject to any disclaimer, the term of this patent is extended or adjusted under 35 U.S.C. 154(b) by 27 days.

(21) Appl. No.: 16/488,337

(22) PCT Filed: Jul. 18, 2018

(86) PCT No.: PCT/KR2018/008132
§ 371 (c)(1),
(2) Date: Aug. 23, 2019

(87) PCT Pub. No.: WO2019/054620
PCT Pub. Date: Mar. 21, 2019

(65) Prior Publication Data
US 2019/0386286 A1    Dec. 19, 2019

(30) Foreign Application Priority Data

Sep. 15, 2017    (KR) .................. 10-2017-0118855

(51) Int. Cl.
*H01M 50/538* (2021.01)
*H01M 50/54* (2021.01)
(Continued)

(52) U.S. Cl.
CPC ....... *H01M 50/538* (2021.01); *H01M 8/0286* (2013.01); *H01M 10/0413* (2013.01); *H01M 50/172* (2021.01); *H01M 50/54* (2021.01)

(58) Field of Classification Search
CPC .................................................. H01M 50/538
See application file for complete search history.

(56) References Cited

U.S. PATENT DOCUMENTS

2002/0146620 A1* 10/2002 Connell ............... H01M 50/54
429/161
2007/0141460 A1    6/2007 You et al.
(Continued)

FOREIGN PATENT DOCUMENTS

EP    2846377 A1    3/2015
JP    S60181859 U    12/1985
(Continued)

OTHER PUBLICATIONS

Extended European Search Report including Written Opinion for Search Report for Application No. 18856897.6 dated Feb. 24, 2020, 7 pages.
(Continued)

*Primary Examiner* — Brian R Ohara
(74) *Attorney, Agent, or Firm* — Lerner, David, Littenberg, Krumholz & Mentlik, LLP (57) ABSTRACT

The present invention relates to a method of manufacturing an electrode lead including: arranging a plurality of lead pieces between a first lead film and a second lead film in a length direction of a lead film including the first lead film and the second lead film; first sealing the first lead film and the second lead film; bending the lead film to form a lead piece laminate in which the plurality of lead pieces are stacked in a height direction with respect to a plane of the lead film; and second sealing the bent lead film overlapping the plurality of lead pieces.

14 Claims, 10 Drawing Sheets

(51) Int. Cl.
*H01M 50/172* (2021.01)
*H01M 8/0286* (2016.01)
*H01M 10/04* (2006.01)

(56) References Cited

U.S. PATENT DOCUMENTS

| | | |
|---|---|---|
| 2010/0188800 A1 | 7/2010 | Ashizaki et al. |
| 2011/0244312 A1 | 10/2011 | Tani et al. |
| 2018/0226626 A1 | 8/2018 | Maeda et al. |

FOREIGN PATENT DOCUMENTS

| | | | |
|---|---|---|---|
| JP | 2000228328 A | | 8/2000 |
| JP | 2011009360 A | | 1/2011 |
| JP | 2011009628 A | | 1/2011 |
| JP | 2011014859 A | | 1/2011 |
| JP | 2011249115 A | | 12/2011 |
| JP | 201354976 A | | 3/2013 |
| JP | 2014032937 A | | 2/2014 |
| JP | 2014035998 A | | 2/2014 |
| JP | 2014143051 A | | 8/2014 |
| JP | 2015032377 A | | 2/2015 |
| KR | 100644904 B1 | | 11/2006 |
| KR | 20100008836 A | | 1/2010 |
| KR | 101090076 B1 | | 12/2011 |
| KR | 20140049654 A | | 4/2014 |
| KR | 20140119560 A | * | 10/2014 |
| KR | 20150045168 A | | 4/2015 |
| KR | 20150090541 A | | 8/2015 |
| KR | 20160019150 A | | 2/2016 |
| KR | 20170058171 A | | 5/2017 |
| WO | 2017038044 A1 | | 3/2017 |

OTHER PUBLICATIONS

International Search Report for Application No. PCT/KR2018/008132 dated Jan. 31, 2019, 2 pages.

* cited by examiner

BATTERY CELL AND METHOD OF MANUFACTURING ELECTRODE LEAD

CROSS-REFERENCE TO RELATED APPLICATIONS

This application is a national phase entry under 35 U.S.C. § 371 of International Application No. PCT/KR2018/008132 filed on Jul. 18, 2018, which claims priority from Korean Patent Application No. 10-2017-0118855 filed in the Korean Intellectual Property Office on Sep. 15, 2017, the entire contents of which are incorporated herein by reference.

TECHNICAL FIELD

The present invention relates to a method of manufacturing an electrode lead.

BACKGROUND ART

Recently, price increases of energy due to the depletion of fossil fuels and the increase of environmental pollution has increased demand for environmentally-friendly alternative energy sources. Therefore, studies of various alternative power generation technologies such as nuclear power, solar power, wind power, and tidal power have been and continue to be conducted, and interest in power storing technologies for efficiently using energy generated as described above has also increased.

Particularly, in accordance with the development of technologies for mobile devices and an increase in demand for such mobile devices, demand for batteries as an energy source has rapidly increased. Therefore, many studies on batteries that may satisfy various energy needs have been conducted.

Moreover, there is a high demand for a prismatic rechargeable battery and a pouch type rechargeable battery that may be used in products, such as mobile phones, due to their small thickness in terms of the shape of such batteries. There is also a high demand for a lithium rechargeable battery, such as a lithium ion battery or a lithium ion polymer battery, having advantages such as a high energy density, a high discharging voltage, and output stability in terms of a material of the battery.

A rechargeable battery is classified depending on how a structure of an electrode assembly in which a cathode, an anode, and a separator interposed between the cathode and the anode are stacked. For example, a jelly-roll type (winding type) electrode assembly includes a structure in which cathodes and anodes having a long sheet shape are wound with each of the separators interposed therebetween, a stack type electrode assembly includes a structure in which a plurality of cathodes and anodes cut in a unit of a predetermined size are sequentially stacked with each of the separators interposed therebetween, and the like. Recently, in order to solve problems of the jelly-roll type electrode assembly and the stack type electrode assembly, a stack/folding type electrode assembly having a structure in which unit cells, in which cathodes and anodes of a predetermined unit are stacked in each of the separators interposed therebetween, are sequentially wound in a state in which they are positioned on separation films has been developed as an electrode assembly having an improved structure in which the jelly-roll type electrode assembly and the stack type electrode assembly are mixed with each other.

In addition, a rechargeable battery can be classified as a cylindrical rechargeable battery in which an electrode assembly is embedded in a cylindrical metal can, a prismatic rechargeable battery in which an electrode assembly is embedded in to a prismatic metal can, and a pouch type rechargeable battery in which an electrode assembly is embedded in a pouch type case formed of an aluminum laminate sheet depending on a shape of a battery case.

Particularly, the pouch type rechargeable battery, which uses a multilayer film formed of a soft material as an outer packaging material, has several advantages that are not present in the cylindrical rechargeable battery or the prismatic rechargeable battery that uses a metal case.

Examples of these advantages may include cheap manufacturing costs, light weight, stability and security since the case is opened before an excessive internal pressure is accumulated, excellent heat dissipation performance, and the like.

Figure 1:
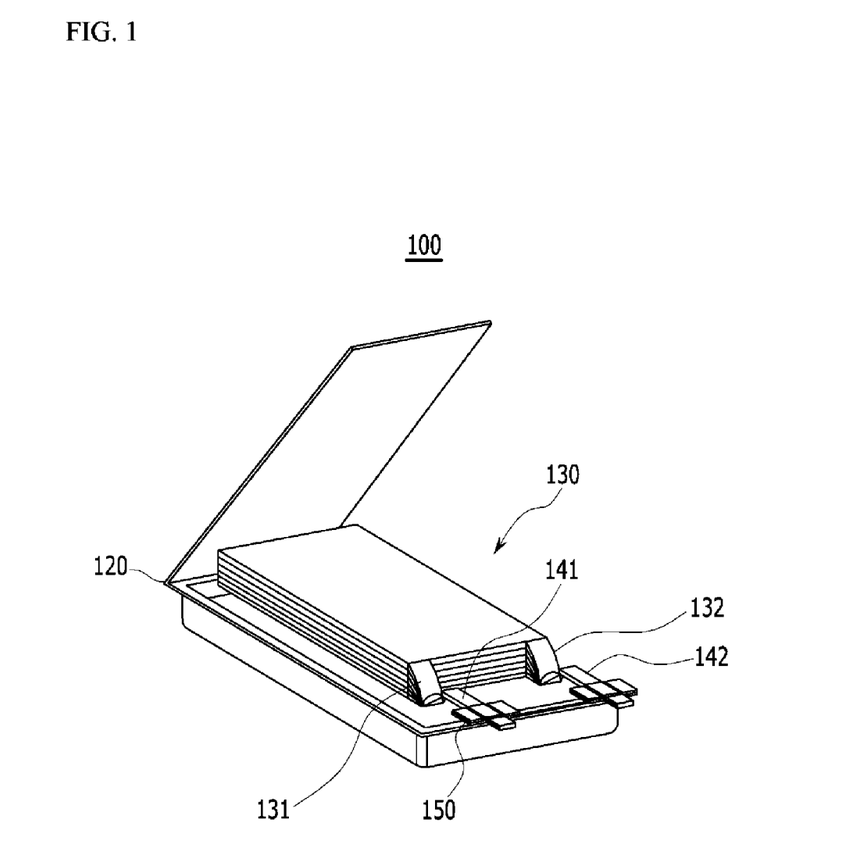
FIG. 1 is a perspective view illustrating a general structure of a pouch type battery cell according to the related art.

FIG. 1 is a schematic exploded perspective view illustrating a general structure of a typical pouch type battery cell according to the related art.

Referring to FIG. 1, a pouch type battery cell 100 is configured to include an electrode assembly 130, electrode tabs 131 and 132 extending from the electrode assembly 130, electrode leads 141 and 142 welded to the electrode tabs 131 and 132, respectively, and a battery case 120 accommodating the electrode assembly 130.

The electrode assembly 130, which is a power generation device in which cathodes and anodes are sequentially stacked with each of separators interposed therebetween, is configured to a stack type or stack/folding type structure. The electrode tabs 131 and 132 extend from the respective electrode plates of the electrode assembly 130, and the electrode leads 141 and 142 are electrically connected, respectively, to a plurality of electrode tabs 131 and 132 extending from the respective electrode plates, for example, by welding, and are partially exposed to the outside of the battery case 120. In addition, an insulating film 150 is attached to portions of upper and lower surfaces of the electrode leads 141 and 142 in order to secure an electrical insulation state between the electrode leads and the battery case 120 while simultaneously increasing a sealing level between the electrode leads and the battery case 120.

However, a rear end of the electrode lead 141 is formed in a bent state due to a narrow space of the battery case 120 which results in a problem that the bent portion of the electrode lead 141 is easily fractured due to external impact or vibrations. In order to solve such a problem, the electrode lead is configured by stacking a plurality of thin metal plates, such that the phenomenon in which the electrode lead is bent may be suppressed by elastic force of the thin metal plates. Therefore, the problem that the electrode lead is easily fractured due to the external impact or the vibrations may be solved.

Figure 2:
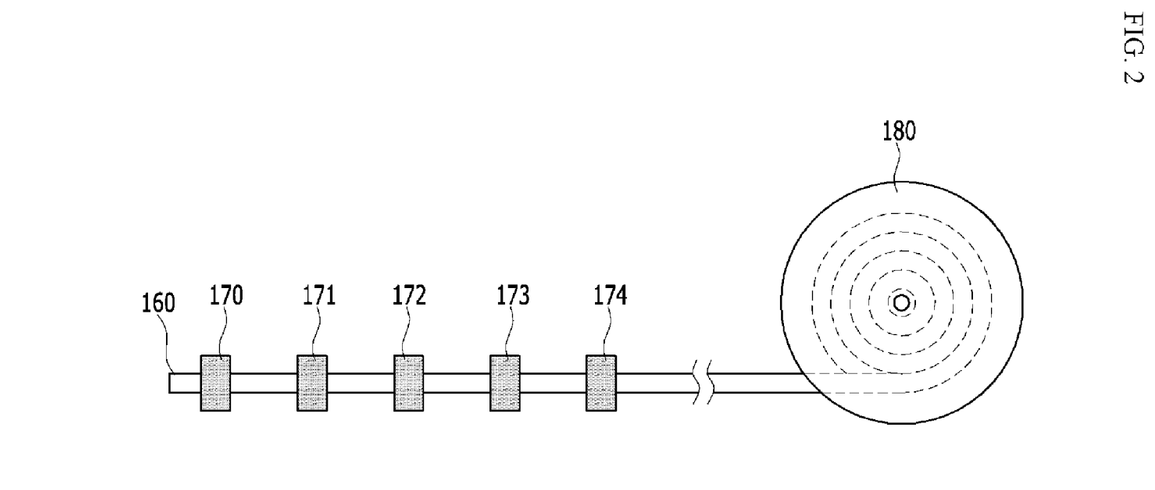
FIG. 2 is a schematic view illustrating a process of manufacturing an electrode lead according to the related art.

Referring to FIG. 2, a process of manufacturing an electrode lead by stacking a plurality of thin metal plates according to the related art is illustrated. First, a plurality of film pieces 170, 171, 172, 173, and 174 are attached to a metal lead 160 reeled from a supply reel 180, and the metal lead 160 is bent so that the plurality of film pieces 170, 171, 172, 173, and 174 may be stacked. In addition, bent portions of the metal lead 160 are cut to manufacture an electrode lead.

When the electrode lead is manufactured by such a method, a thickness of the electrode lead is very small.

Therefore, it is not easy to cut the bent portions of the electrode lead, such that manufacturing time and costs are increased.

Therefore, there is a need for a technique that may fundamentally solve such a problem.

DISCLOSURE

Technical Problem

An object of the present invention is to solve the problem of the related art as described above and a technical problem required from the past.

The present inventors have confirmed that an electrode lead having high sealing force may be implemented and productivity may be improved through simplification of a manufacturing process by bending a lead film in which a plurality of lead pieces are sealed to allow the plurality of lead pieces to be stacked and sealing the bent lead film overlapping the plurality of lead pieces to manufacture the electrode lead.

Technical Solution

An exemplary embodiment of the present invention provides a method of manufacturing an electrode lead, including: arranging a plurality of lead pieces between a first lead film and a second lead film in a length direction of a lead film including the first lead film and the second lead film; bending the lead film to form a lead piece laminate in which the plurality of lead pieces are stacked in a height direction with respect to a plane of the lead film; and sealing the bent lead film overlapping the plurality of lead pieces.

The plurality of bent portions may be formed in the lead film.

The first lead film and the second lead film may be formed at the same size and be formed of the same material.

Each of the plurality of lead pieces may be a rectangular plate having a length greater than a width, and a direction vertical to the length direction of the lead film may be a length direction of each of the lead pieces.

The lead film may be bent in a "Z" shape to form the lead piece laminate.

After the lead piece laminate is formed, the bent lead film may be sealed.

The method of manufacturing an electrode lead may further include, before the lead piece laminate is formed, sealing the bent lead film after the lead film is bent at least once.

The sealing may be performed by thermal fusion.

The method of manufacturing an electrode lead may further include, before the lead film is bent, sealing the first lead film and the second lead film.

In the sealing of the first lead film and the second lead film, the lead film and side surfaces of the lead pieces may be in contact with each other.

A thermal fusion level in the sealing of the first lead film and the second lead film may be lower than that in the sealing of the bent lead film.

The thermal fusion level in the sealing of the first lead film and the second lead film may be 30% to 60% of the thermal fusion level in the sealing of the bent lead film.

The plurality of lead piece laminates may be formed in the lead film.

The method of manufacturing an electrode lead may further include cutting the plurality of lead piece laminates.

An exemplary embodiment of the present invention provides a battery cell including the electrode lead manufactured by the method of manufacturing an electrode lead, including: an electrode assembly including an electrode tab protruding toward at least one outer circumferential side; a battery case including a sealing portion having a structure in which an outer circumferential side is sealed by thermal fusion in a state in which the electrode assembly is mounted in a receiving portion; and the electrode lead protruding toward the outside of the battery case through the sealing portion in a state in which the electrode lead is connected to the electrode tab of the electrode assembly, wherein the electrode lead includes a lead piece laminate in which a plurality of lead pieces are stacked in a height direction with respect to a plane, and a lead film bent to overlap the plurality of lead pieces is sealed.

The lead film may include a first lead film and a second lead film, and the first lead film or the second lead film may be positioned at an uppermost end or a lowermost end of the lead piece laminate.

The first lead film and the second lead film may be alternately positioned between the plurality of lead pieces.

A thickness of the lead piece laminate may not exceed 0.2 mm.

A thickness of the lead piece may be 0.01 mm to 0.04 mm.

MODE FOR INVENTION

Hereinafter, the present invention will be described in detail with reference to the drawings according to an exemplary embodiment of the present invention, but the scope of the present invention is not limited thereto.

Figure 3:
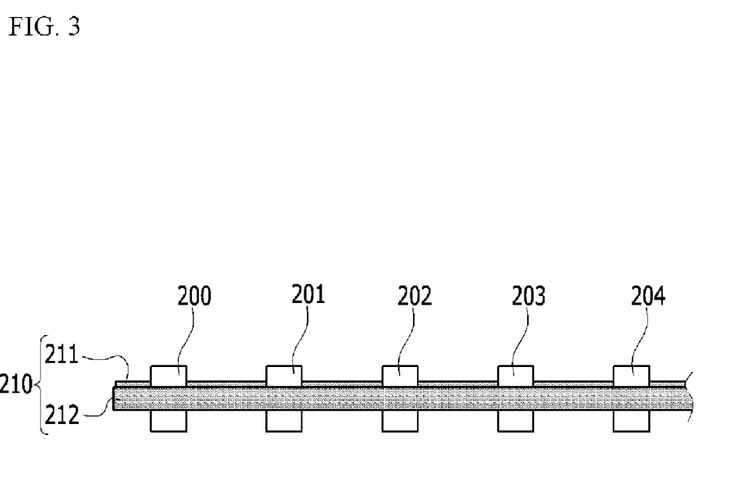
FIG. 3 is a schematic view illustrating that a plurality of lead pieces are arranged between a first lead film and a second lead film according to an exemplary embodiment of the present invention.

FIG. 3 is a schematic view illustrating that a plurality of lead pieces are arranged between a first lead film and a second lead film according to an exemplary embodiment of the present invention.

Referring to FIG. 3, a lead film 210 includes a first lead film 211 and a second lead film 212, and lead pieces 200, 201, 202, 203, and 204 are arranged between the first lead film 211 and the second lead film 212. Each of the lead pieces 200, 201, 202, 203, and 204 is a rectangular plate having a length greater than a width, and is disposed so that a width direction of the lead film 210 that is vertical to a length direction of the lead film 210 is a length direction of each of the lead pieces 200, 201, 202, 203, and 204. A shape or a size of each of the lead pieces 200, 201, 202, 203, and 204 is not particularly limited, and may be selected in consideration of an internal space of a battery case, a connection relationship with external tabs, a level at which electrode leads are exposed to the outside of the battery case, and the like.

In order to increase a sealing force between the first lead film 211 and the second lead film 212 in a sealing process by thermal fusion to be described below, sizes and materials of the first lead film 211 and the second lead film 212 may be the same as each other.

Figure 4:
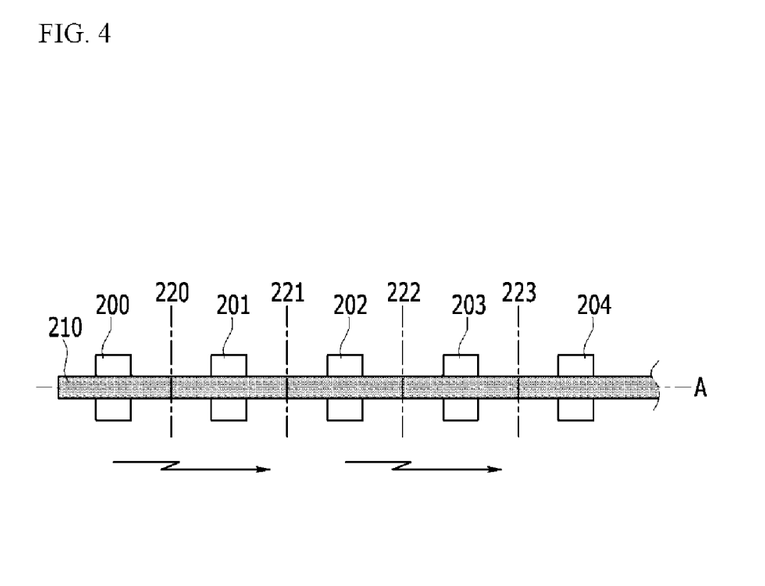
FIG. 4 is a plan view illustrating a structure in which the first lead film, the lead pieces, and the second lead film overlap each other in FIG. 3.

FIG. 4 is a plan view illustrating a structure in which the first lead film, the lead pieces, and the second lead film overlap each other unlike in FIG. 3.

Referring to FIGS. 3 and 4, bent portions 220, 221, 222, and 223 are formed in the lead film 210, and the lead film 210 is bent in an arrow direction along the bent portions 220, 221, 222, and 223. For example, the lead film 210 is bent on the basis of a first bent portion 220 between a first lead piece 200 and a second lead piece 201 neighboring to each other, such that a portion of the first lead film 211 overlapping the second lead piece 201 may be disposed to face a portion of the first lead film 211 overlapping the first lead piece 200.

In addition, the lead film 210 is bent on the basis of a second bent portion 221 between the second lead piece 201 and a third lead piece 202 neighboring to each other, such that a portion of the second lead film 212 overlapping the third lead piece 202 may be disposed to face a portion of the second lead film 212 overlapping the second lead piece 201.

In addition, the lead film 210 is bent on the basis of a third bent portion 222 between the third lead piece 202 and a fourth lead piece 203 neighboring to each other, such that a portion of the first lead film 211 overlapping the fourth lead piece 203 may be disposed to face a portion of the first lead film 211 overlapping the third lead piece 202.

In addition, the lead film 210 is bent on the basis of a fourth bent portion 223 between the fourth lead piece 203 and a fifth lead piece 204 neighboring to each other, such that a portion of the second lead film 212 overlapping the fifth lead piece 204 may be disposed to face a portion of the second lead film 212 overlapping the fourth lead piece 203.

Figure 5:
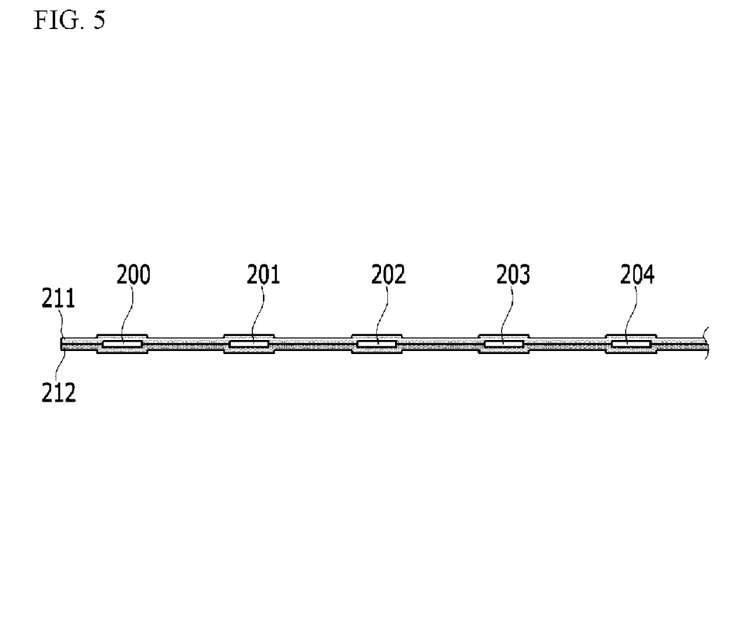
FIG. 5 is a vertical cross-sectional view taken along a single-dot chain line A of FIG. 4.

FIG. 5 is a vertical cross-sectional view taken along a single-dot chain line A of FIG. 4.

Referring to FIGS. 4 and 5, side surfaces of the lead pieces 200, 201, 202, 203, and 204 in a width direction may be covered by the first lead film 211 and the second lead film 212. The side surfaces of the lead pieces 200, 201, 202, 203, and 204 in the width direction may be in contact with the first lead film 211 and the second lead film 212, and a sealing process may be performed for such a contact. In this case, the first lead film 211 and the second lead film 212 positioned between lead pieces neighboring to each other may be sealed to each other. As a modified example, unlike illustrated in FIG. 6, even though the first lead film 211 and the second lead film 212 positioned between the lead pieces neighboring to each other are sealed to each other by the sealing process, the side surfaces of the lead pieces 200, 201, 202, 203, and 204 in the width direction are not in contact with the first lead film 211 and the second lead film 212, but may also be spaced apart from the first lead film 211 and the second lead film 212.

Figure 6:
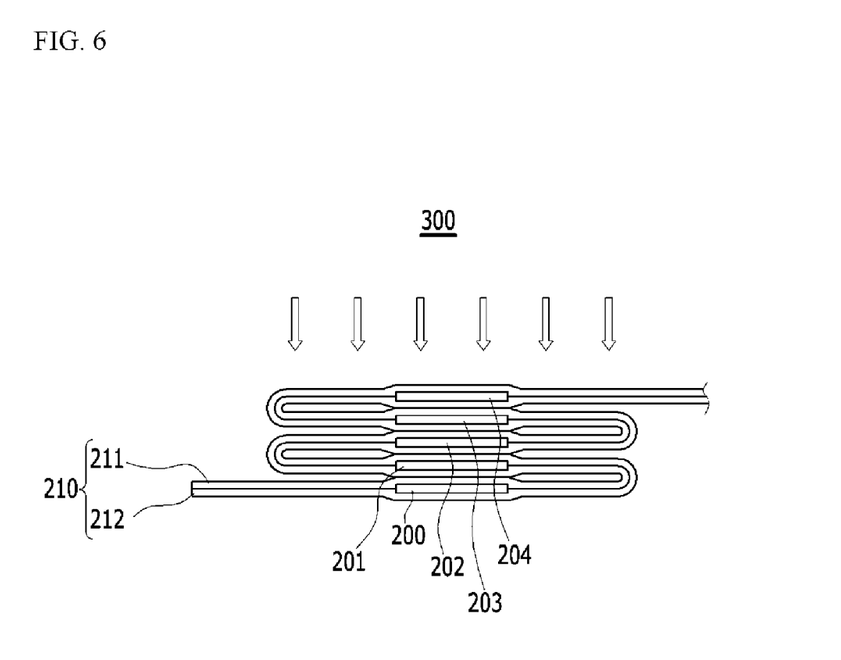
FIG. 6 is a vertical cross-sectional view illustrating a lead piece laminate in which the lead pieces of FIG. 4 are stacked.

FIG. 6 is a vertical cross-sectional view illustrating a lead piece laminate in which the lead pieces of FIG. 4 are stacked.

Referring to FIGS. 4 and 6, in a lead piece laminate 300, the lead film 210 is bent, such that the lead pieces 200, 201, 202, 203, and 204 are stacked in a height direction with respect to a plane of the lead film 210. Particularly, the lead film 210 is bent in a "Z" shape along the bent portions 220, 221, 222, and 223. A shape in which the lead film 210 is bent may be variously selected in consideration of a thickness, a length, and the like, of the lead piece laminate 300.

After all the lead pieces 200, 201, 202, 203, and 204 are stacked, the bent lead film 210 overlapping the lead pieces 200, 201, 202, 203, and 204 is sealed (see arrows of FIG. 6). A case in which the sealing of the lead film 210 described above is performed at only an upper portion is illustrated for convenience of explanation, but the sealing may be performed at the upper portion or a lower portion, and both of the upper and lower portions.

Figure 7:
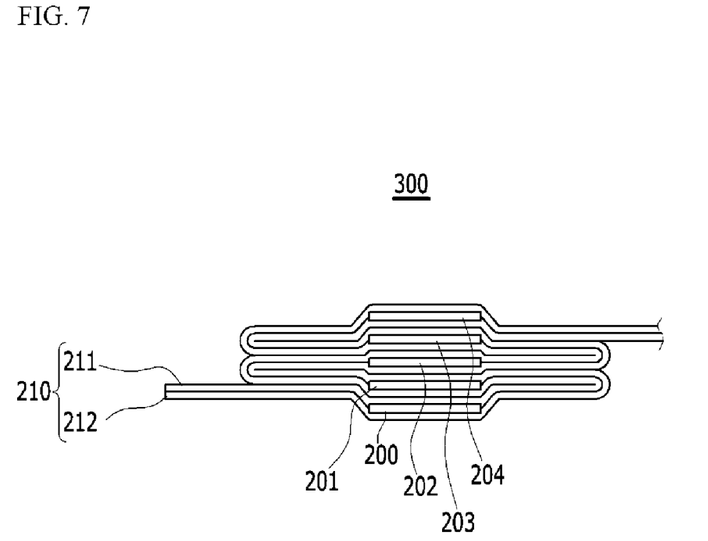
FIG. 7 is a vertical cross-sectional view illustrating a state in which the lead piece laminate of FIG. 5 is sealed.

FIG. 7 is a vertical cross-sectional view illustrating a state in which the lead piece laminate of FIG. 5 is sealed.

Referring to FIGS. 5 and 7, in the sealed lead piece laminate 300, the bent lead film 210 overlapping the lead pieces 200, 201, 202, 203, and 204 is sealed. The sealed lead piece laminate 300 is cut from the lead film 210 to manufacture an electrode lead. As described above, a method of manufacturing an electrode lead according to an exemplary embodiment of the present invention does not require a separate process of cutting the lead pieces from the lead piece laminate 300, and a time required for a manufacturing process of the electrode lead is thus reduced, such that high productivity may be expected.

Figure 8:
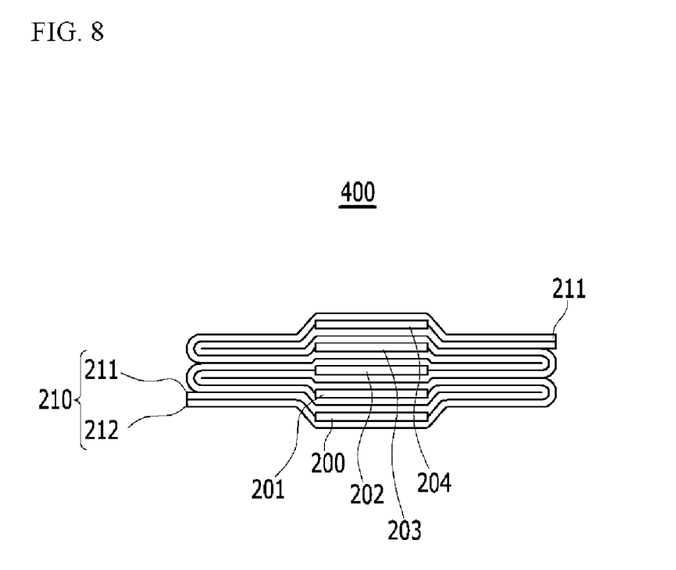
FIG. 8 is a vertical cross-sectional view of an electrode lead as manufactured according to an exemplary embodiment described in FIGS. 3 to 7.

FIG. 8 is a vertical cross-sectional view of an electrode lead manufactured according to an exemplary embodiment described in FIGS. 3 to 7.

Referring to FIG. 8, an electrode lead 400 includes a lead piece laminate in which the lead pieces 200, 201, 202, 203, and 204 are stacked in a height direction with respect to a plane, and the lead film 210 bent to overlap the lead pieces 200, 201, 202, 203, and 204 is sealed.

The lead film 210 includes the first lead film 211 and the second lead film 212, the first lead film 211 is positioned at the uppermost end of the electrode lead 400, and the second lead film 212 is positioned at the lowermost end of the electrode lead 400. Unlike this exemplary embodiment, a bent direction is reversed, such that the first lead film 211 may be positioned at the lowermost end of the electrode lead 400 and the second lead film 212 may be positioned at the uppermost end of the electrode lead 400. The first lead film 211 and the second lead film 212 are alternately positioned between the lead pieces 200, 201, 202, 203, and 204.

Here, it is preferable that a thickness of the lead piece laminate is 0.2 mm or less in order to increase the sealing force of the electrode lead 400 and the battery case. In addition, it is preferable that a thickness of each of the lead pieces 200, 201, 202, 203, and 204 is 0.01 mm to 0.04 mm. When the thickness of each of the lead pieces 200, 201, 202, 203, and 204 is less than 0.01 mm, it is not easy to treat the lead pieces 200, 201, 202, 203, and 204 in a manufacturing process, and sufficient strength of the electrode lead 400 may not be secured. When the thickness of each of the lead pieces 200, 201, 202, 203, and 204 exceeds 0.4 mm, sufficient elastic force of the lead pieces 200, 201, 202, 203, and 204 may not be secured, such that the phenomenon in which the electrode lead 400 is bent may not be suppressed.

In addition, in order to secure the required strength and elasticity of the electrode lead 400, thicknesses of the lead pieces 200, 201, 202, 203, and 204 may be variously configured. As an example, the lead pieces may be configured so that thicknesses thereof are decreased or increased toward the top or the bottom on the basis of the lead piece 202 positioned at the center of the lead piece laminate 300 in the height direction.

When the sealing process described in FIG. 5 is called first sealing and the sealing process described in FIG. 6 is called second sealing, the first sealing and the second sealing may be performed by various methods, but may be performed by thermal fusion as an example. In addition, a thermal fusion level of the second sealing of FIG. 6 is relatively lower than that of the first sealing of FIG. 5. The second sealing may be performed at a thermal fusion level at which the lead pieces 200, 201, 202, 203, and 204 are attached to regular positions between the first lead film 211 and the second lead film 212 and the lead pieces 200, 201, 202, 203, and 204 are not separated from regular positions in a step of bending the lead film 210. In contrast, it is preferable that the first sealing is performed at a thermal fusion level relatively higher than that of the second sealing since it is preferable that the bent lead film 210 overlapping the lead pieces 200, 201, 202, 203, and 204 is sufficiently sealed and a thickness of the electrode lead is decreased as much as possible. As an example, the thermal fusion level of the second sealing may be 30% to 60% of the thermal fusion level of the first sealing.

Figure 9:
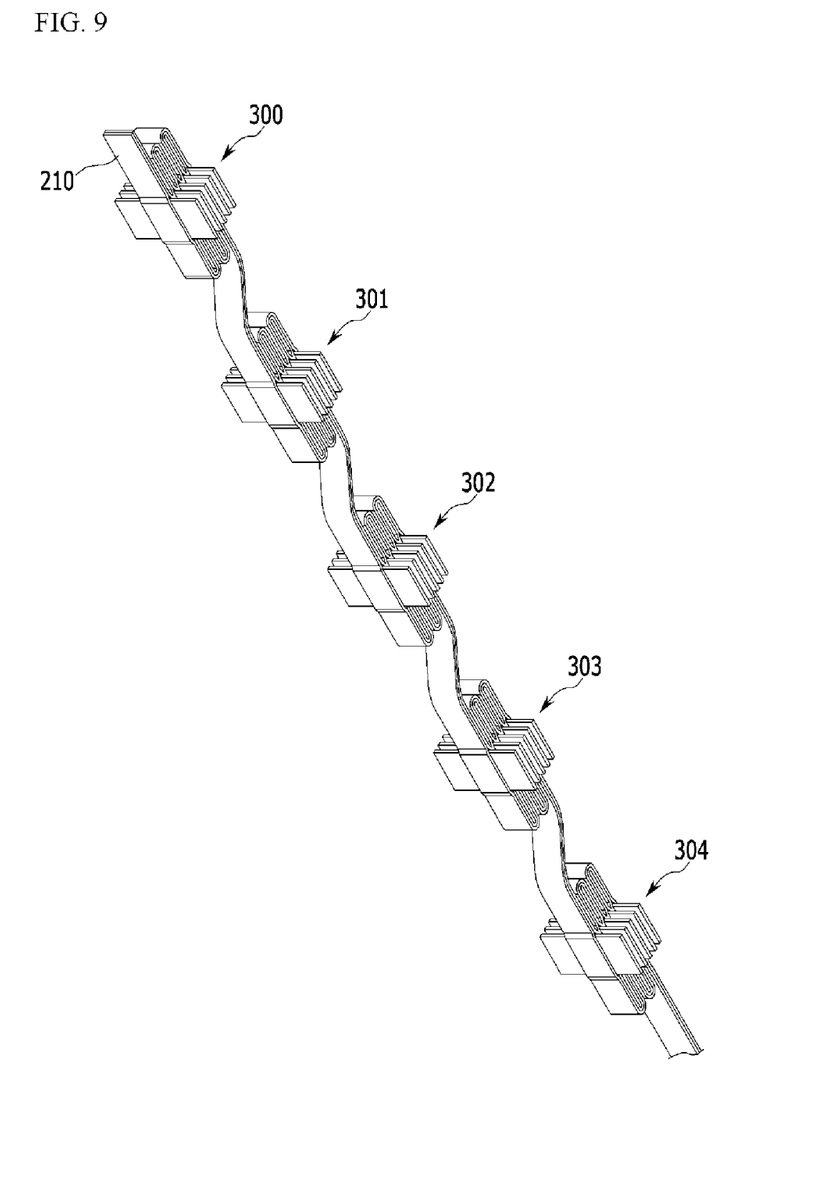
FIG. 9 is a schematic view illustrating that a plurality of lead piece laminates are formed in one lead film.

FIG. 9 is a schematic view illustrating that a plurality of lead piece laminates are formed in one lead film.

Referring to FIG. 9, a plurality of lead piece laminates 300, 301, 302, 303, and 304 are formed in one lead film 210.

Figure 10:
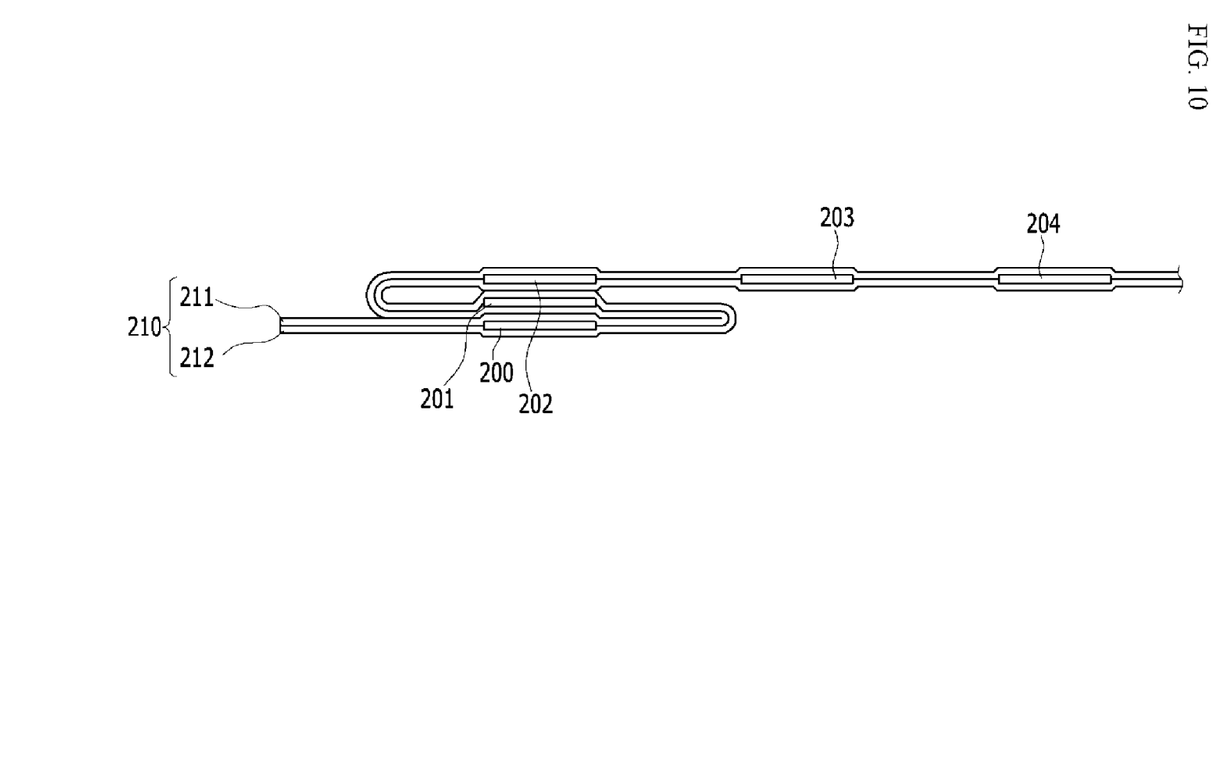
FIG. 10 is a cross-sectional view illustrating an electrode lead by a method different from a method of manufacturing an electrode lead described in FIG. 7.

FIG. 10 is a cross-sectional view illustrating an electrode lead by a method different from a method of manufacturing an electrode lead described in FIG. 7.

Referring to FIGS. 4 and 10, whenever one lead piece is stacked, the bent lead film 210 may be sealed to form the lead piece laminate. First, the lead film 210 is bent on the basis of the first bent portion 220 between the first lead piece 200 and the second lead piece 201 neighboring to each other, such that a portion of the first lead film 211 overlapping the second lead piece 201 may be disposed to face a portion of the first lead film 211 overlapping the first lead piece 200, and the bent lead film 210 may be sealed. In addition, the lead film 210 is bent on the basis of the second bent portion 221 between the second lead piece 201 and the third lead piece 202 neighboring to each other, such that a portion of the second lead film 212 overlapping the third lead piece 202 may be disposed to face a portion of the second lead film 212 overlapping the second lead piece 201, and the bent lead film 210 may be sealed. The other lead pieces 203 and 204 may be stacked in the same manner to form the lead piece laminates.

Therefore, more firm sealing force may be secured, and a volume of the lead piece laminate in the height direction may be decreased.

Those skilled in the art will to which the present invention pertains may perform various applications and modifications without departing from the scope of the present invention on the basis of the contents described above.

INDUSTRIAL APPLICABILITY

As described above, in the method of manufacturing an electrode lead according to the present invention, the lead film in which the plurality of lead pieces are sealed is bent to allow the plurality of lead pieces to be stacked, and the bent lead film overlapping the plurality of lead pieces is sealed to manufacture the electrode lead, such that an electrode lead having high sealing force may be implemented, and the manufacturing process may be simplified to improve productivity.

The invention claimed is:

1. A method of manufacturing an electrode lead, comprising:
   arranging a plurality of lead pieces between a first lead film and a second lead film in a length direction of a lead film including the first lead film and the second lead film;
   bending the lead film to form a lead piece laminate in which the plurality of lead pieces are stacked in a height direction with respect to a plane of the lead film; and
   sealing the bent lead film overlapping the plurality of lead pieces.

2. The method of manufacturing an electrode lead of claim 1, wherein:
   a plurality of bent portions are formed in the lead film.

3. The method of manufacturing an electrode lead of claim 1, wherein:
   the first lead film and the second lead film are formed at the same size and are formed of the same material.

4. The method of manufacturing an electrode lead of claim 1, wherein:
   each of the plurality of lead pieces is a rectangular plate having a length greater than a width, and a direction vertical to the length direction of the lead film is a length direction of each of the lead pieces.

5. The method of manufacturing an electrode lead of claim 1, wherein:
   the lead film is bent in a "Z" shape to form the lead piece laminate.

6. The method of manufacturing an electrode lead of claim 5, wherein:
   after the lead piece laminate is formed, the bent lead film is sealed.

7. The method of manufacturing an electrode lead of claim 5, further comprising:
   before the lead piece laminate is formed, sealing the bent lead film after the lead film is bent at least once.

8. The method of manufacturing an electrode lead of claim 1, wherein:
   the sealing is performed by thermal fusion.

9. The method of manufacturing an electrode lead of claim 8, further comprising:
   before the lead film is bent, sealing the first lead film and the second lead film.

10. The method of manufacturing an electrode lead of claim 9, wherein:
    in the sealing of the first lead film and the second lead film, the lead film and side surfaces of the lead pieces are in contact with each other.

11. The method of manufacturing an electrode lead of claim 9, wherein:
    a thermal fusion level in the sealing of the first lead film and the second lead film is lower than that in the sealing of the bent lead film.

12. The method of manufacturing an electrode lead of claim 11, wherein:
    the thermal fusion level in the sealing of the first lead film and the second lead film is 30% to 60% of the thermal fusion level in the sealing of the bent lead film.

13. The method of manufacturing an electrode lead of claim 1, wherein:
   a plurality of lead piece laminates are formed in the lead film.

14. The method of manufacturing an electrode lead of claim 13, further comprising:
   cutting the plurality of lead piece laminates.

\* \* \* \* \*